(12) United States Patent
Barea et al.

(10) Patent No.: US 7,025,948 B2
(45) Date of Patent: Apr. 11, 2006

(54) ITQ-31 CRYSTALLINE SOLID, AND A PROCESS FOR ITS PREPARATION

(75) Inventors: Eva Barea, Valencia (ES); Vicente Fornes, Valencia (ES); Avelino Corma, Valence (ES); Patrick Bourges, Lyons (FR); Emmanuelle Guillon, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/102,879

(22) Filed: Apr. 11, 2005

(65) Prior Publication Data

US 2005/0244330 A1    Nov. 3, 2005

(30) Foreign Application Priority Data

Apr. 9, 2004    (FR) .................................. 04 03823

(51) Int. Cl.
    *C01B 39/48* (2006.01)
(52) U.S. Cl. ...................... 423/718; 423/708; 423/709; 423/328.2; 423/329.1; 423/594.9; 423/713
(58) Field of Classification Search ................ 423/708, 423/709, 713, 328.2, 329.1, 594.9
    See application file for complete search history.

(56) References Cited

U.S. PATENT DOCUMENTS

| 4,623,529 | A | * | 11/1986 | Sanders et al. ............. 423/709 |
| 4,826,667 | A | * | 5/1989 | Zones et al. ................ 423/706 |
| 2003/0185751 | A1 | | 10/2003 | Sandeep et al. |
| 2003/0231999 | A1 | | 12/2003 | Cao et al. |

FOREIGN PATENT DOCUMENTS

WO    WO 03106340    12/2003

* cited by examiner

*Primary Examiner*—David Sample
(74) *Attorney, Agent, or Firm*—Millen, White, Zelano & Branigan, P.C.

(57) ABSTRACT

The invention concerns a crystalline solid, designated ITQ-31, which has the X ray diffraction diagram given below. Said solid has a chemical composition, expressed as the anhydrous base in terms of moles of oxide, defined by the general formula $XO_2$: $mYO_2$:$pZ_2O_3$:$qR$:$sF$, in which R represents an organic nitrogen-containing template, X represents one or more tetravalent elements other than germanium, Y represents germanium, Z represents at least one trivalent element and F is fluorine.

13 Claims, 1 Drawing Sheet

ITQ-31 CRYSTALLINE SOLID, AND A PROCESS FOR ITS PREPARATION

FIELD OF THE INVENTION

Figure 1:
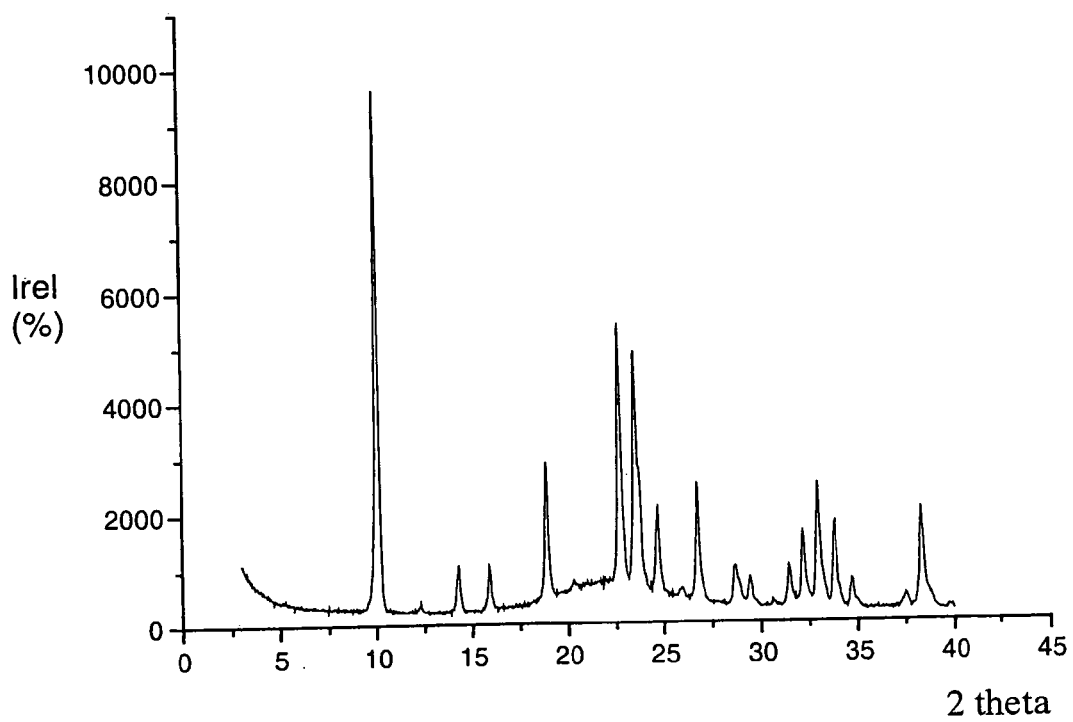

The present invention relates to a novel crystalline solid, hereinafter termed ITQ-31, having a novel crystalline structure, and to a process for preparing said solid.

PRIOR ART

The development of novel microporous molecular sieves has led over recent years to the synthesis of a wide variety of this class of products. A wide variety of aluminosilicates with a zeolitic structure, characterized by their chemical composition, the diameter of the pores they contain and the shape and geometry of their microporous system, has been developed.

A certain number of solid zeolites synthesized over the past forty years have allowed considerable advances in the fields of adsorption and catalysis. Examples that can be cited are Y zeolites (U.S. Pat. No. 3,130,007) and ZSM-5 zeolite (U.S. Pat. No. 3,702,886). The number of novel molecular sieves, encompassing zeolites, which are synthesized every year, is constantly increasing. A more complete description of the various molecular sieves can be obtained from the work entitled "Atlas of zeolite structure types", Ch. Baerlocher, W M Meier and D H Olson, Fifth Revised Edition, 2001, Elsevier. The following can be cited: NU-87 zeolite (U.S. Pat. No. 5,178,748), MCM-22 zeolite (U.S. Pat. No. 4,954,325) or gallophosphate (cloverite) with structure type CLO (U.S. Pat. No. 5,420,279) or the zeolites ITQ-12 (U.S. Pat. No. 6,471,939), ITQ-13 (U.S. Pat. No. 6,471,941), CIT-5 (U.S. Pat. No. 6,043,179), ITQ-21 (International patent application WO-02/092511) and ITQ-22 (Corma, A et al, Nature Materials 2003, 2, 493), SSZ-53 (Chem Eur J, 9 (23) 5737–5748 (2003)), SSZ-59 (Chem Eur J, 9 (23) 5737–5748 (2003)), SSZ-58 (Burton A, et al, J Am Chem Soc 2003, 125, 1633) and UZM-5 (Blackwell, C S et al, Angew Chem Int Ed, 2003, 42, 1737).

Some of the zeolites cited above have been synthesized in a fluoride medium in which the mobilizing agent is not the usual hydroxide ion but a fluoride ion in accordance with a process initially in U.S. Pat. No. 4,073,865. The pH of the synthesis media was typically close to neutrality. One advantage of such fluorine-containing reaction systems is to allow the production of purely siliceous zeolites containing fewer defects than zeolites obtained in a traditional OH⁻ medium (J M Chézeau et al, Zeolites 1991, 11, 598). A further decisive advantage of using fluorine-containing reaction media is to allow the production of novel framework topologies containing double cycles of four tetrahedra, as is the case with ITQ-7, ITQ-13 and ITQ-17 zeolites. However, the combined use of sources of germanium and silicon in the synthesis media can produce such frameworks in a conventional non-fluorinated basic medium, as is the case for ITQ-17 and ITQ-21 (A Coma et al, Chem, Commun 2001, 16, 1486, Chem Commun, 2003, 9, 1050).

DESCRIPTION OF THE INVENTION

The present invention provides a novel crystalline solid designated ITQ-31 crystalline solid, with a novel crystal structure. Said solid has a chemical composition, expressed as the anhydrous base in terms of moles of oxide, defined by the following general formula: formula $XO_2:mYO_2:pZ_2O_3:qR:sF$, in which R represents a organic nitrogen-containing compound, X represents one or more tetravalent elements other than germanium, Y represents germanium, Z represents at least one trivalent element, F is fluorine, and m, p, q, s respectively represent the number of moles of $YO_2$, $Z_2O_3$, R and F.

The crystalline solid ITQ-31 of the invention has an X ray diffraction diagram including at least the peaks shown in Table 1. The peaks in Table 1 preferably correspond to a ITQ-31 solid in the as synthesized form. This novel crystalline solid ITQ-31 has a novel crystal structure.

The X ray diffraction diagram is obtained by radiocrystallographic analysis using a diffractometer, using the conventional powder technique using the copper $K\alpha 1$ line ($\lambda=1.5406$ Å). Starting from the position of the diffraction peaks represented by the angle $2\theta$, the Bragg relationship is used to calculate the characteristic interplanar spacings, $d_{hkl}$ of the sample. The error in measurement $\Delta(d_{hkl})$ over $d_{hkl}$ is calculated from the Bragg relationship as a function of the absolute error $\Delta(2\theta)$ in the measurement of $2\theta$. An absolute error $\Delta(2\theta)$ of $\pm 0.2°$ is normally allowable. The relative intensity $I_{rel}$ for each value of $d_{hkl}$ is measured from the height of the corresponding diffraction peak. The X ray diffraction diagram of the crystalline solid ITQ-31 of the invention includes at least the lines with the $d_{hkl}$ values given in Table 1. The $d_{hkl}$ column shows the mean values for the interplanar spacings in angstroms (Å). Each of these values has a measurement error $\Delta(d_{hkl})$ in the range $\pm 0.2$ Å to $\pm 0.008$ Å.

TABLE I

Mean values for $d_{hkl}$ and relative intensities measured for an X ray diffraction diagram for the ITQ-31 crystalline solid of the invention

| $d_{hkl}$ (Å) | 2 theta (°) | $I/I_0$ |
|---|---|---|
| 8.72 | 10.12 | vs |
| 7.19 | 12.29 | vw |
| 6.17 | 14.32 | vw |
| 5.55 | 15.93 | vw |
| 4.69 | 18.90 | w |
| 4.36 | 20.32 | vw |
| 3.90 | 22.72 | m |
| 3.77 | 23.55 | mw |
| 3.73 | 23.81 | w |
| 3.60 | 24.70 | w |
| 3.43 | 25.94 | vw |
| 3.32 | 26.76 | w |
| 3.11 | 28.66 | vw |
| 3.03 | 29.43 | vw |
| 2.91 | 30.65 | vw |
| 2.84 | 31.46 | vw |
| 2.77 | 32.18 | w |
| 2.71 | 32.95 | w |
| 2.64 | 33.81 | w |
| 2.58 | 34.74 | vw |
| 2.39 | 37.50 | vw |
| 2.34 | 38.33 | w | in which vw=very strong; m=mean; w=weak; s=strong; mw=medium weak; vw=very weak.

The relative intensity $I/I_0$ is given as a relative intensity scale to which the value of 100 is given to the most intense line on the X ray diffraction diagram: vw<15; 15≦w<30; 30≦mw<50; 50≦m<65; 65≦S<85; VS≧85.

Advantageously, the ratio Ge/X of the framework of the crystalline solid ITQ-31 of the invention is in the range 0.01 to 1, preferably in the range 0.05 to 0.33. The ratio {(1+m)/p} is 5 or more, preferably 7 or more. The value of p is preferably in the range 0 to 0.5, more preferably in the range 0 to 0.4 and still more preferably in the range 0.01 to 0.4.

The value of q is advantageously in the range 0.01 to 0.7, very advantageously in the range 0.1 to 0.5. s is in the range 0.01 to 0.7, preferably in the range 0.01 to 0.5. m is in the range 0.01 to 1.

In accordance with the invention, X is preferably selected from silicon, tin and titanium, and Z is preferably selected from aluminium, boron, iron, indium and gallium; highly preferably, Z is aluminium. Preferably, X is silicon: the crystalline solid ITQ-31 of the invention is thus a crystalline metallosilicogermanate with an X ray diffraction diagram identical to that described in Table 1. More preferably again, X is silicon and Z is aluminium: the crystalline solid ITQ-31 of the invention is thus a crystalline aluminosilicogermanate with an X ray diffraction diagram identical to that described in Table 1.

In the case in which the crystalline solid ITQ-31 of the invention is in its as synthesized form, i.e. directly from synthesis and prior to any calcining step and/or ion exchange step that is known to the skilled person, said solid ITQ-31 comprises an organic nitrogen-containing template as described below or its decomposition products, or its precursors. In accordance with the invention, R is a template from the diamines family, and in a preferred implementation of the invention, the organic nitrogen-containing template R has formula $R_1R_2$—N—$(CH_2)_x$—N—$R_3R_4$, in which $R_{i, \, i=1-4}$=H or $C_nH_{2n+1}$, n being in the range 1 to 6 and x being in the range 1 to 12, groups $R_1$ and $R_2$ preferably being identical and groups $R_3$ and $R_4$ preferably being identical. Groups $R_1$ and $R_2$ may be identical or different from groups $R_3$ and $R_4$. The template can be eliminated using known methods such as heat and/or chemical treatments.

The crystalline solid ITQ-31 of the invention is preferably a zeolitic solid.

The invention also concerns a process for preparing a crystalline solid ITQ-31, in which an aqueous mixture comprising at least one source of at least one oxide $XO_2$, at least one source of oxide $YO_2$, optionally at least one source of at least one oxide $Z_2O_3$ and at least one organic nitrogen-containing template R is reacted, the mixture generally having the following molar composition:

| | |
|---|---|
| $(XO_2 + YO_2)/Z_2O_3$ | at least 5, preferably at least 7; |
| $H_2O/(XO_2 + YO_2)$ | 1 to 50, preferably 2 to 30; |
| $R/(XO_2 + YO_2)$ | 0.1 to 3, preferably 0.1 to 1; |
| $F/(XO_2 + YO_2)$ | 0.01 to 0.7, preferably 0.01 to 0.5; |
| $YO_2/XO_2$ | 0.01 to 1, preferably 0.5 to 1; | in which X is one or more tetravalent elements other than germanium, preferably silicon, Y is germanium, Z is one or more trivalent elements selected from the group formed by the following elements: aluminium, iron, boron, indium and gallium, preferably aluminium.

The fluorine can be introduced in the form of alkali metal or ammonium salts, such as NaF, $NH_4F$, $NH_4HF_2$ or in the form of hydrofluoric acid or in the form of hydrolysable compounds which can liberate fluorine anions in water, such as silicon fluoride $SiF_4$ or ammonium fluorosilicate $(NH_4)_2SiF_6$ or sodium fluorosilicate $Na_2SiF_6$.

In accordance with the process of the invention, R is an organic nitrogen-containing template. Preferably, R is a diamine and more preferably, R has formula $R_1R_2$—N—$(CH_2)_x$—N—$R_3R_4$, in which $R_{i, \, i=1-4}$=H or $C_nH_{2n+1}$, n being in the range 1 to 6 and x being in the range 1 to 12, groups $R_1$ and $R_2$ preferably being identical and groups $R_3$ and $R_4$ preferably being identical. Groups $R_1$ and $R_2$ may be identical or different from groups $R_3$ and $R_4$. Compounds R with the general formula indicated above are commercially available. More preferably still, the organic nitrogen-containing template is the compound N,N'-dimethyl-1,3-propanediamine or the compound 3-dimethylamine-1-propylamine. These compounds are sold by Aldrich.

The source of element X can be any compound comprising element X and which can liberate said element in aqueous solution in the reactive form. Advantageously, when element X is silicon, the source of the silica can be any of those routinely used in zeolite synthesis, for example solid powdered silica, silicic acid, colloidal silica, dissolved silica or tetraethoxysilane (TEOS). Powdered silicas which can be used include precipitated silicas, in particular those obtained by precipitation from a solution of an alkali metal silicate, such as aerosil silicas, pyrogenated silicas, for example "CAB-O-SIL", and silica gels. Colloidal silicas with different particle sizes can be used, for example with a mean equivalent diameter in the range 10 to 15 mm or between 40 and 50 mm, such as those sold under the trade mark "LUDOX". Preferably, the silicon source is LUDOX.

The source of element Z may be any compound comprising the element Z which can liberate that element in aqueous solution in the reactive form. In the preferred case in which Z is alumina, the alumina source is preferably sodium aluminate, or an aluminium salt, for example a chloride, nitrate, hydroxide or sulphate, an aluminium alkoxide or alumina proper, preferably in the hydrated form or hydratable, such as colloidal alumina, pseudoboehmite, gamma alumina or alpha or beta trihydrate. It is also possible to use mixtures of the sources cited above.

The source of the element Y can, for example, be germanium oxide $GeO_2$.

In a preferred implementation of the process of the invention, an aqueous mixture comprising silica, alumina, a germanium oxide, hydrofluoric acid and a diamine, preferably a compound selected from N,N'-dimethyl-1,3-propanediamine and 3-dimethylamine-1-propylamine, are reacted together.

The process of the invention consists of preparing an aqueous reaction mixture known as a gel and comprising at least one source of at least one oxide $XO_2$, at least one source of the oxide $YO_2$, optionally at least one source of the oxide $Z_2O_3$ and at least one organic nitrogen-containing template R, or at least one precursor for an organic nitrogen-containing template or at least one decomposition product of an organic nitrogen-containing template. The quantities of said reagents are adjusted to endow this gel with a composition that allows its crystallization into a crystalline solid ITQ-31 with formula $XO_2$:$mYO_2$:$pZ_2O_3$:$qR$:$sF$ in which m, p, q and s satisfy the criteria given above. The gel then undergoes hydrothermal treatment until the crystalline solid ITQ-31 is formed. The hydrothermal conditions to which the gel is subjected are advantageously applied under autogenous reaction pressure, optionally adding a gas, for example nitrogen, at a temperature in the range 120° C. to 200° C., preferably in the range 140° C. to 180° C., and more preferably at a temperature which does not exceed 175° C. until crystals of solid ITQ-31 of the invention are formed. The time necessary to obtain crystallization is generally between 1 hour and several months, depending on the composition of the reagents in the gel, the stirring and the reaction temperature. The reaction is generally carried out with stirring or in the absence of stirring, preferably in the presence of stirring.

It may be advantageous to add seeds to the reaction mixture to reduce the time required for the formation of nuclei and/or the total crystallization period. It may also be advantageous to use seeds to encourage the formation of the crystalline solid ITQ-31 to the detriment of the impurities. Said seeds comprise crystalline solids, in particular crystals of solid ITQ-31. The crystalline seeds are generally added in a proportion in the range 0.01% to 10% of the weight of the oxide $XO_2$, preferably silica, used in the reaction mixture.

At the end of the reaction, the solid phase is filtered and washed; it is then ready for subsequent steps such as drying, dehydration and calcining and/or ion exchange. For these steps, any conventional method which is known to the skilled person may be employed.

The present invention also concerns the use of the solid ITQ-31 as an adsorbent.

Preferably, the solid ITQ-31 is freed of the organic template when it is used as an adsorbent. When used as an adsorbent, the crystalline solid ITQ-31 of the invention is generally dispersed in an inorganic matrix phase which contains channels and cavities which allow the fluid to be separated access to the crystalline solid. Such matrices are preferably mineral oxides, for example silicas, aluminas, silica-aluminas or clays. The matrix generally represents between 2% and 25%.

The invention will now be illustrated in the following examples.

EXAMPLE 1

4.35 g of germanium oxide (Aldrich, purity 99.998%) was mixed with 24.758 g of water (milli Q at 18.2Ω), 3.27 g of N,N'-dimethyl-1,3-propanediamine (97% pure, Aldrich) and 12.5 g of a solution of colloidal silica (Ludox AS). The mixture was stirred vigorously for 2 hours and when it was homogeneous, 2.59 g of hydrofluoric acid HF (48.1%, J T Baker) was added and the whole was mixed for a further 10 minutes.

The molar composition of the gel was $SiO_2$: 0.5 $GeO_2$: 0.75 HF: 0.38 R: 22.5 $H_2O$ The gel was then transferred into a Teflon sleeve, and the sleeve was placed in a 20 millilitre autoclave heated to 150° C. for 10 days, with stirring.

The dried product was analyzed by powder X ray diffraction and identified as being constituted by solid ITQ-31. The diffractogram produced from the as synthesized product was identical to that given in FIG. 1. Chemical analysis of the product by X ray fluorescence was carried out and produced the ratio Si/Ge=10.

EXAMPLE 2

0.24 g of aluminium hydroxide $Al(OH)_3$ (38.8% $H_2O$, Aldrich) was mixed with 1.74 g of germanium oxide $GeO_2$ (Aldrich, purity 99.998%), 2.57 g of N,N'-dimethyl-1,3-propanediamine (97% pure, Aldrich) and 12.5 g of a solution of colloidal silica (Ludox AS, 40% $H_2O$). The mixture was stirred vigorously for 2 hours until 3.27 g of water had evaporated off. 2.07 g of hydrofluoric acid HF (48.1%, J T Baker) was then added and the whole was mixed for a further 10 minutes.

The molar composition of the gel was $SiO_2$: 0.2$GeO_2$: 0.02 $Al_2O_3$: 0.6 HF: 0.3 R: 3.6 $H_2O$ The gel was transferred into a Teflon sleeve, and the sleeve was placed in a 20 millilitre autoclave heated to 150° C. for 10 days, with stirring.

The dried product was analyzed by powder X ray diffraction and identified as being constituted by solid ITQ-31. The diffractogram produced from the as synthesized product was identical to that given in FIG. 1.

EXAMPLE 3

1.74 g of germanium oxide $GeO_2$ (Aldrich, purity 99.998%) was mixed with 2.57 g of N,N'-dimethyl-1,3-propanediamine (97% pure, Aldrich) and 12.5 g of a solution of colloidal silica (Ludox AS, 40% $H_2O$). The mixture was stirred vigorously for 2 hours until 3.25 g of water had been evaporated off. 2.06 g of hydrofluoric acid HF (48.1%, J T Baker) was then added and the whole was vigorously mixed for a further 15 minutes.

The molar composition of the gel was $SiO_2$: 0.2$GeO_2$: 0.6 HF: 0.3 R: 3.6 $H_2O$ The gel was then transferred into a Teflon sleeve, and the sleeve was placed in a 20 millilitre autoclave heated to 150° C. for 10 days, with stirring.

The dried product was analyzed by powder X ray diffraction and identified as being constituted by solid ITQ-31. The diffractogram produced from the as synthesized product was identical to that given in FIG. 1.

EXAMPLE 4

For preparing an adsorbent based on ITQ-31 zeolite, use the synthesized solid of Example 1 comprising the organic template N,N'-dimethyl-1,3-propanediamine.

Heat this solid initially in a stream of nitrogen at a temperature of 200° C. for 4 hours then calcine same, still in a nitrogen atmosphere, at 550° C. for 8 hours. Following these initial treatments, calcine the resultant solid at 550° C. for 8 hours in a stream of air then a further 8 hours in a stream of oxygen.

Form the resultant solid into extrudates by mixing with bochmite (Pural SB3, Sasol) in a Z arm mixer and extruding the resultant paste with a piston extruder. Dry resultant extrudates at 120° C. for 12 hours in air and calcine same at 550° C. for 2 hours in a stream of air in a muffle furnace.

The resultant adsorbent should generally be composed of 80% of zeolitic solid ITQ-31 and 20% of alumina.

The entire disclosures of all applications, patents and publications, cited herein and of corresponding French application No. 04/03.823, filed Apr. 9, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A crystalline solid ITQ-31 having an X ray diffraction diagram including at least the peaks shown in the table below:

| $d_{hkl}$ (Å) | 2 theta (°) | $I/I_0$ |
| --- | --- | --- |
| 8.72 | 10.12 | vs |
| 7.19 | 12.29 | vw |
| 6.17 | 14.32 | vw |
| 5.55 | 15.93 | vw |

-continued

| $d_{hkl}$ (Å) | 2 theta (°) | $I/I_0$ |
|---|---|---|
| 4.69 | 18.90 | w |
| 4.36 | 20.32 | vw |
| 3.90 | 22.72 | m |
| 3.77 | 23.55 | mw |
| 3.73 | 23.81 | w |
| 3.60 | 24.70 | w |
| 3.43 | 25.94 | vw |
| 3.32 | 26.76 | w |
| 3.11 | 28.66 | vw |
| 3.03 | 29.43 | vw |
| 2.91 | 30.65 | vw |
| 2.84 | 31.46 | vw |
| 2.77 | 32.18 | w |
| 2.71 | 32.95 | w |
| 2.64 | 33.81 | w |
| 2.58 | 34.74 | vw |
| 2.39 | 37.50 | vw |
| 2.34 | 38.33 | w | in which vs=very strong; m=mean; w=weak; s=strong; mw=medium weak; vw=very weak, and having a chemical composition, expressed as the anhydrous base in terms of moles of oxide defined by the following general formula: $XO_2:mYO_2: pZ_2O_3:qR:sF$, in which R represents a organic nitrogen-containing compound, X represents one or more tetravalent elements other than germanium, Y represents germanium, Z represents at least one trivalent element, F is fluorine, and m, p, q, s respectively represent the number of moles of $YO_2$, $Z_2O_3$, R and F and m is in the range of 0.01 to 1, p is in the range of 0 to 0.5, q is in the range of 0.01 to 0.7, s is in the range of 0.01 to 0.7, and the ratio $\{(1+m)/p\}$ is 5 or more.

2. A crystalline solid ITQ-31 according to claim 1, in which X is silicon.

3. A crystalline solid ITQ-31 according to claim 2, in which Z is aluminum.

4. A crystalline solid ITQ-31 according to claim 1, in which Z is aluminum.

5. A crystalline solid ITQ-31 according to claim 1, having an X-ray diffraction diagram substantially in accordance with FIG. 1.

6. A process for preparing a crystalline solid ITQ-31 according to claim 1, comprising mixing at least one source of at least one oxide $XO_2$, at least one source of the oxide $YO_2$, optionally at least one source of at least one oxide $Z_2O_3$ and at least one organic nitrogen-containing template R, or at least one precursor for a nitrogen-containing template R, or at least one decomposition product of an organic nitrogen-containing template, then carrying out a hydrothermal treatment on said mixture until said crystalline solid ITQ-31 forms.

7. A preparation process according to claim 6, in which seeds are added to the reaction mixture.

8. A preparation process according to claim 6, in which R is the compound N,N'-dimethyl-1,3-propanediamine or the compound 3-dimethylamine-1-propylamine.

9. A preparation process according to claim 8, in which seeds are added to the reaction mixture.

10. A process for preparing a crystalline solid ITQ-31 according to claim 6, in which the molar composition of the reaction mixture is such that:

| | |
|---|---|
| $(XO_2 + YO_2)/Z_2O_3$ | at least 5; |
| $H_2O/(XO_2 + YO_2)$ | 1 to 50; |
| $R/(XO_2 + YO_2)$ | 0.1 to 3; |
| $F/(XO_2 + YO_2)$ | 0.01 to 0.7; |
| $YO_2/XO_2$ | 0.01 to 1. |

11. A preparation process according to claim 10, in which R is the compound N,N'-dimethyl-1,3-propanediamine or the compound 3-dimethylamine-1-propylamine.

12. A preparation process according to claim 11, in which seeds are added to the reaction mixture.

13. A preparation process according to claim 10, in which seeds are added to the reaction mixture.

* * * * *

UNITED STATES PATENT AND TRADEMARK OFFICE
CERTIFICATE OF CORRECTION

| | |
|---|---|
| PATENT NO. | : 7,025,948 B2 |
| APPLICATION NO. | : 11/102879 |
| DATED | : April 11, 2006 |
| INVENTOR(S) | : Eva Barea et al. |

It is certified that error appears in the above-identified patent and that said Letters Patent is hereby corrected as shown below:

On the Title page, item 75 Inventors: line 3, reads "Lyons" should read -- Lyon --

Signed and Sealed this

Twentieth Day of February, 2007

JON W. DUDAS
*Director of the United States Patent and Trademark Office*